United States Patent
Shah et al.

(10) Patent No.: US 8,547,829 B1
(45) Date of Patent: Oct. 1, 2013

(54) DYNAMICALLY ENHANCED NETWORK PERFORMANCE FOR DISTRIBUTED WIRELESS LOCAL AREA NETWORK (WLAN) ARCHITECTURE

(75) Inventors: Sandip Shah, Milpitas, CA (US); Jeffrey L Pochop, Jr., Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 12/951,480

(22) Filed: Nov. 22, 2010

(51) Int. Cl.
*G01R 31/08* (2006.01)

(52) U.S. Cl.
USPC .......................... 370/217; 370/252; 709/232

(58) Field of Classification Search
USPC ............... 370/217–220, 252–253, 328–338, 370/352, 465–473, 401–427; 709/232, 227
See application file for complete search history.

(56) References Cited

U.S. PATENT DOCUMENTS

| 2011/0235615 A1* | 9/2011 | Kalhan | 370/331 |
| 2012/0106523 A1* | 5/2012 | Anumala et al. | 370/338 |
| 2012/0257611 A1* | 10/2012 | Buckley | 370/338 |

* cited by examiner

*Primary Examiner* — Ricky Ngo
*Assistant Examiner* — Iqbal Zaidi
(74) *Attorney, Agent, or Firm* — Harrity & Harrity, LLP

(57) ABSTRACT

A device receives topology and capability information associated with an access point, access devices, and aggregation devices of a wireless local area network (WLAN), and determines, based on the topology and capability information, a nearest capable access device or aggregation device to the access point. The device also provides an instruction that instructs the access point or the nearest capable access device or aggregation device to create a tunnel between the access point and the nearest capable access device or aggregation device. The access point or the nearest capable access device or aggregation device creates the tunnel between the access point and the nearest capable access device or aggregation device based on the instruction.

21 Claims, 10 Drawing Sheets

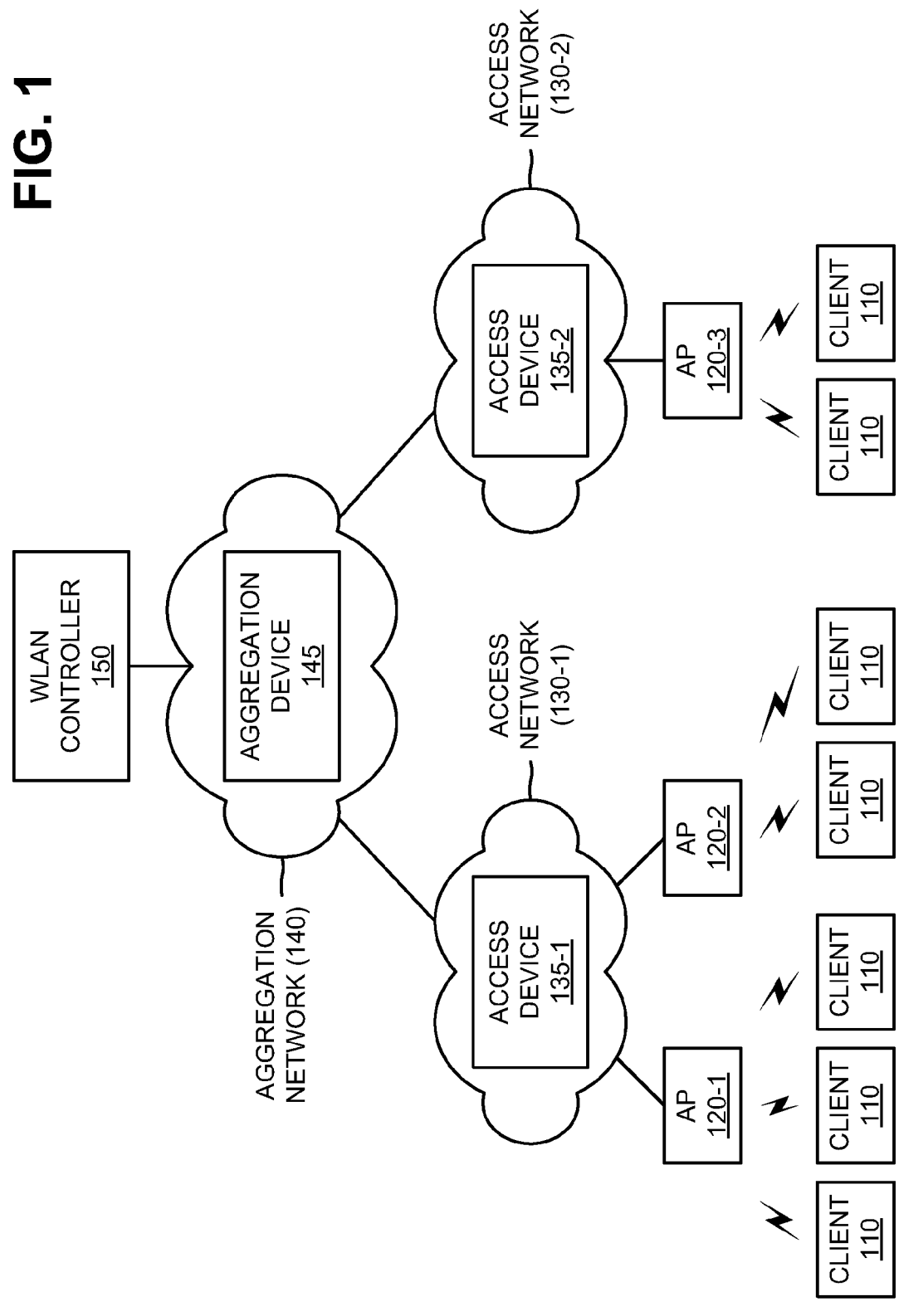

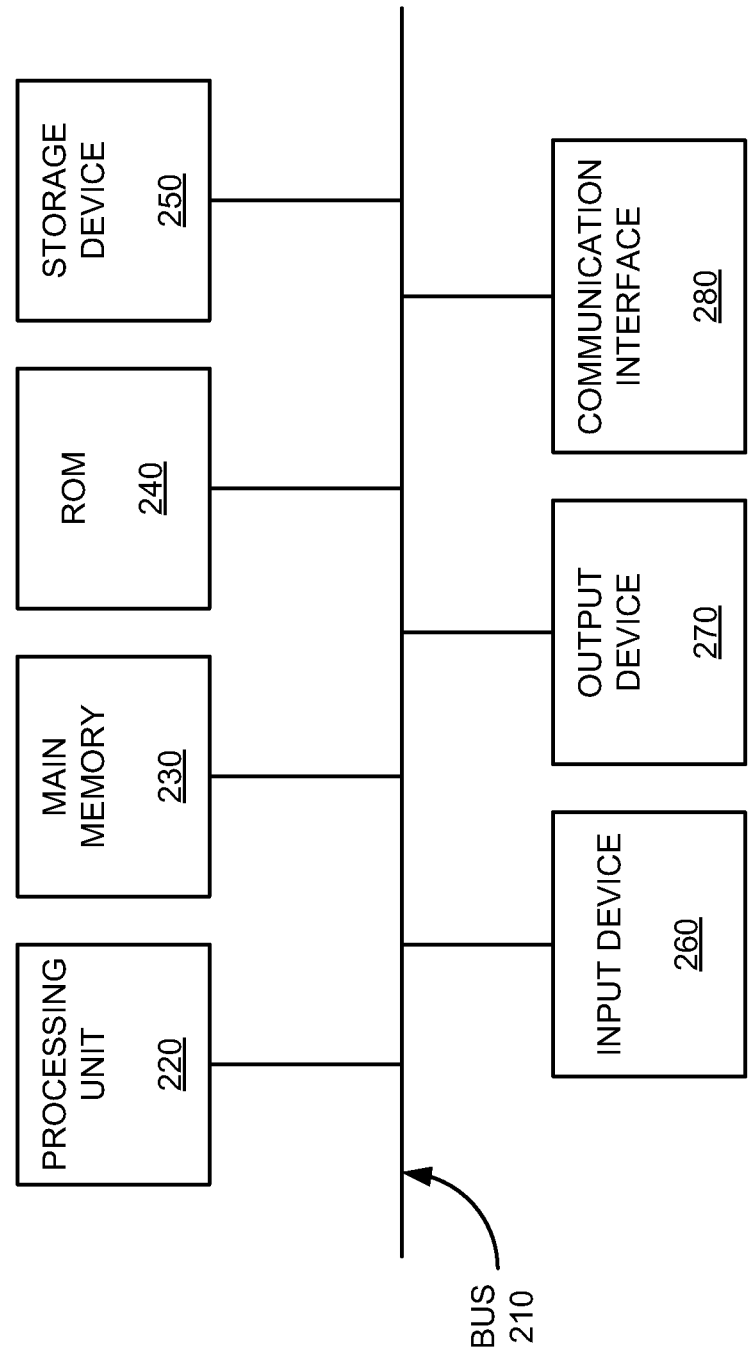

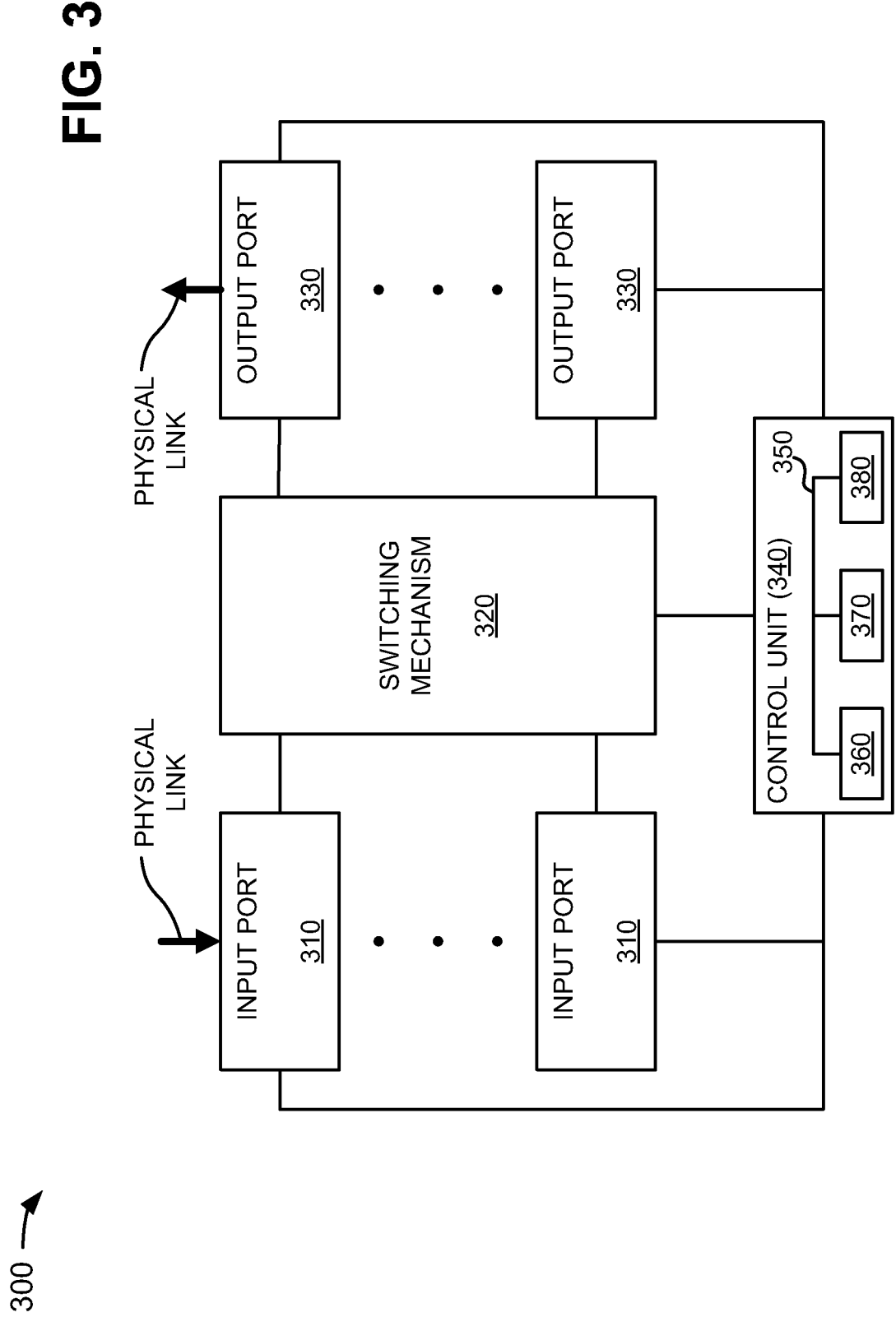

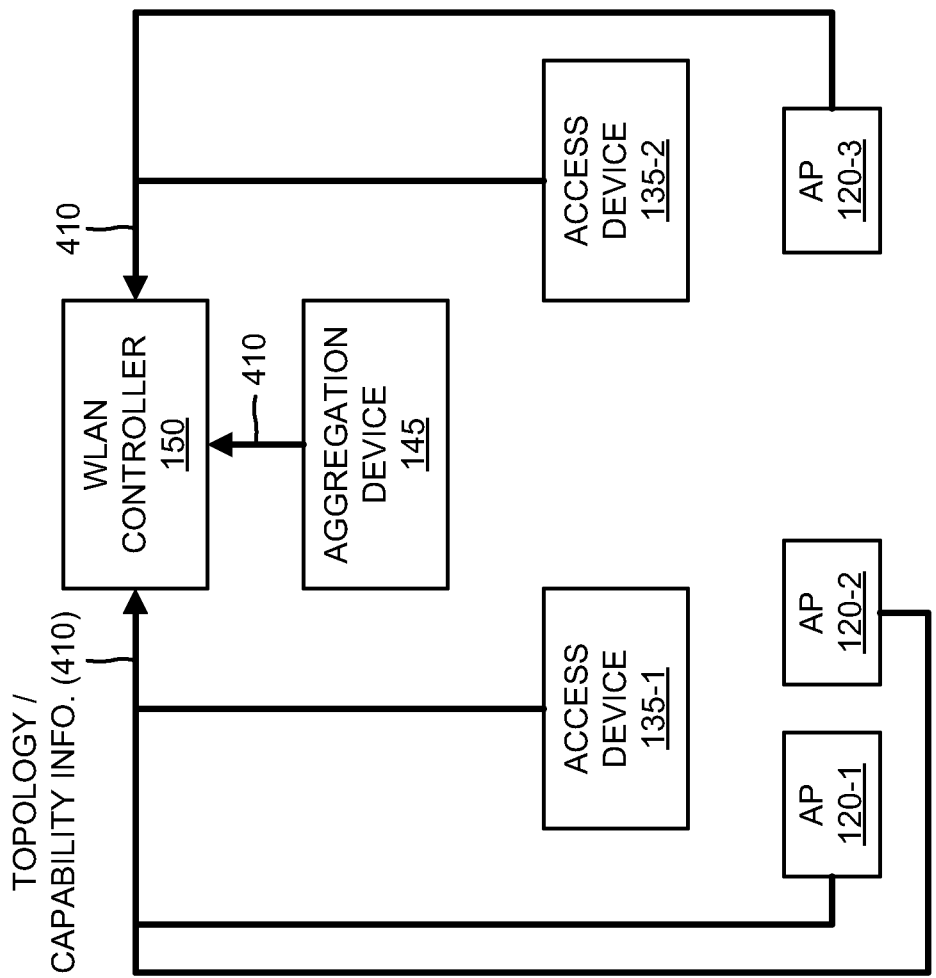

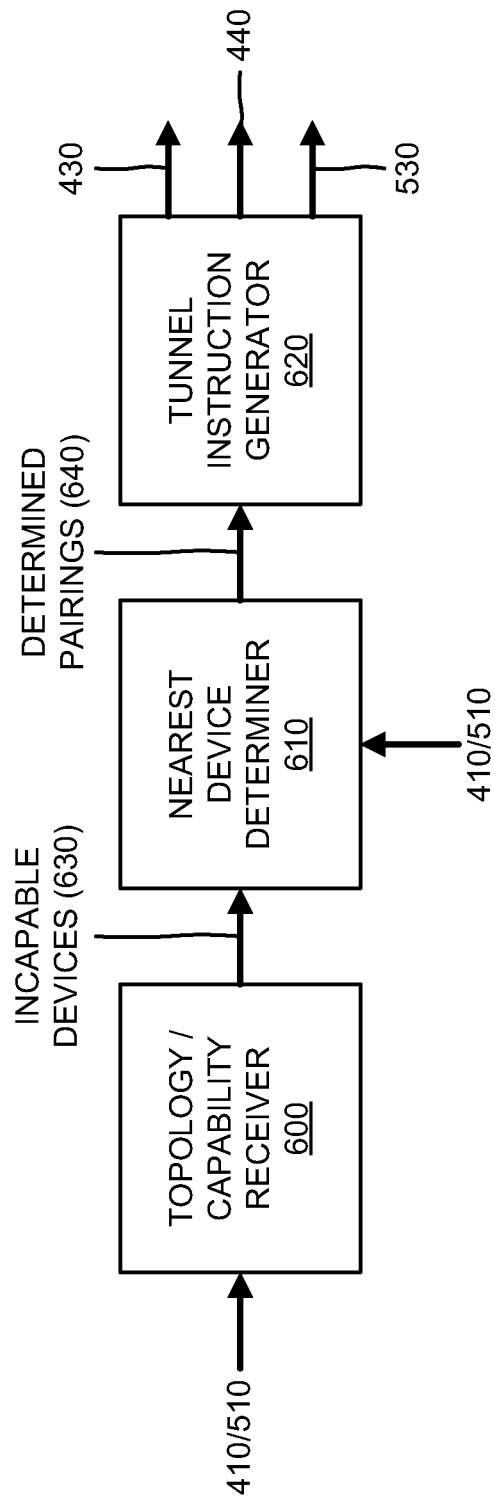

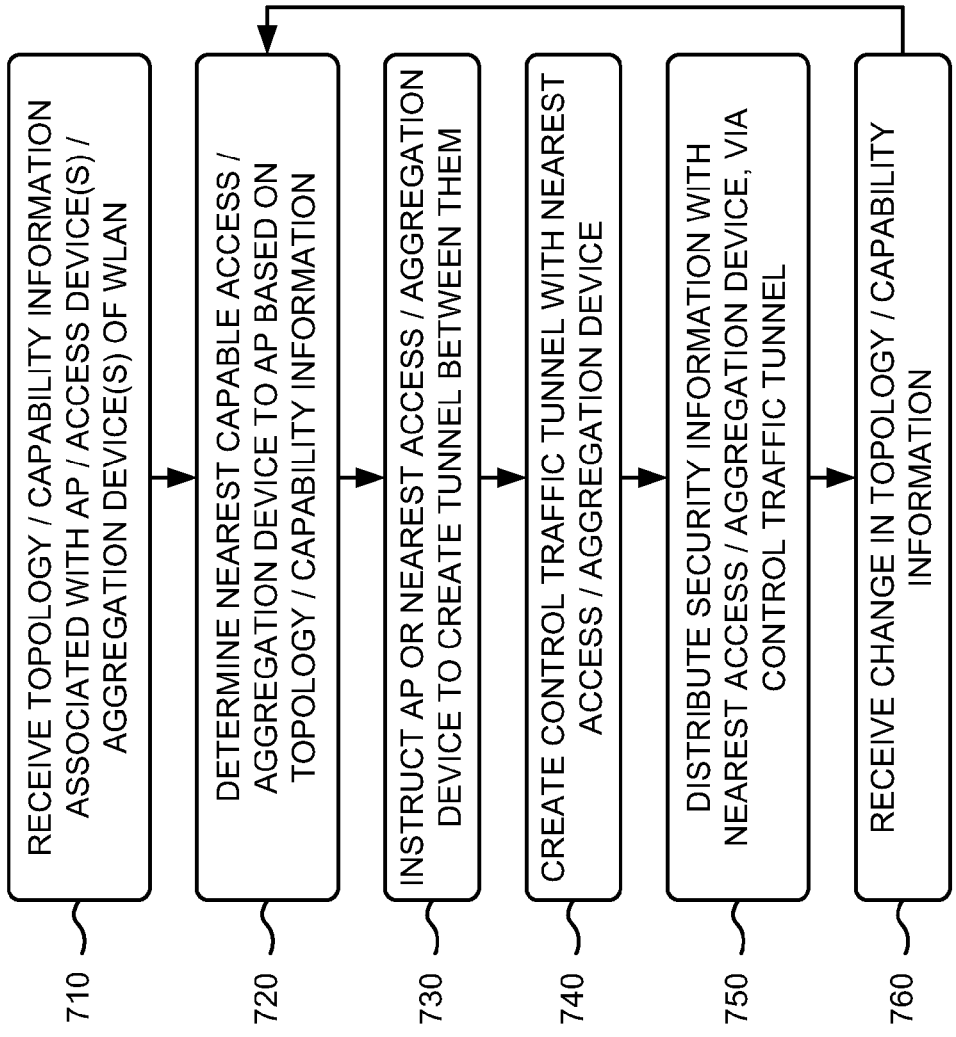

DYNAMICALLY ENHANCED NETWORK PERFORMANCE FOR DISTRIBUTED WIRELESS LOCAL AREA NETWORK (WLAN) ARCHITECTURE

BACKGROUND

A wireless local area network (WLAN) links two or more devices using some wireless distribution method, and usually provides a connection through an access point (AP) to other networks. A wireless access point (or access point) is a device that allows wired communication devices (e.g., network devices, such as routers, firewalls, switches, or gateways, which transfer or switch data, such as packets) to connect to a wireless network (e.g., a WLAN) using wireless technologies (e.g., Wi-Fi, Bluetooth, or related standards). The access point may connect to a network device (e.g., connected to a network), and may relay data between wireless devices (e.g., client devices, such as personal computers, laptop computers, printers, smart phones, etc.) and the network device. In one example, an access point may include a wireless network device, such as a wireless router.

A typical corporate use of access points involves attaching several access points to a wired network (e.g., a corporate intranet that includes one or more network devices) and providing wireless access to client devices located, for example, in a building. The access points may form a WLAN for the client devices, and may be managed by a WLAN controller. The WLAN controller may handle automatic adjustments to radio frequency (RF) power, channels, authentication, and/or security associated with the access points. The WLAN controller may communicate with an aggregation network (e.g., that includes an aggregation device), and the aggregation network may communicate with multiple access networks (e.g., that include access devices). The access points may communicate with one or more access networks.

Most current WLAN architectures are centralized, where the access points and the WLAN controller are deployed as an overlay over a wired network (e.g., a wired enterprise network). However, the centralized WLAN architecture is not scalable since all data traffic is communicated through the WLAN controller. This may create bottlenecks at the WLAN controller and may not efficiently utilize available bandwidth. A manually-deployed distributed WLAN architecture is one alternative to the centralized WLAN architecture. With the distributed WLAN architecture, control traffic may be tunneled to the WLAN controller, and data traffic may be tunneled to an access layer or an aggregation layer. However, creating such tunnels requires significant manual configuration overhead, especially for larger architectures. Furthermore, a change in the distributed WLAN network topology requires a substantial amount of manual configuration changes.

SUMMARY

According to one aspect, a method, implemented by a computing device, may include receiving, by the computing device, topology and capability information associated with an access point, one or more access devices, and one or more aggregation devices of a wireless local area network (WLAN). The method may also include determining, by the computing device and based on the topology and capability information, a nearest capable access device or aggregation device to the access point, and causing, by the computing device, creation of a tunnel between the access point and the nearest capable access device or aggregation device.

According to another aspect, a device may include a memory to store instructions, and a processor to execute instructions in the memory to: receive topology and capability information associated with an access point, access devices, and aggregation devices of a wireless local area network (WLAN); determine, based on the topology and capability information, a nearest capable access device or aggregation device to the access point; and cause creation of a tunnel between the access point and the nearest capable access device or aggregation device.

According to still another aspect, one or more computer-readable media may store instructions executable by one or more processors. The media may store one or more instructions for: receiving topology and capability information associated with an access point, access devices, and aggregation devices of a wireless local area network (WLAN); and determining, based on the topology and capability information, a nearest capable access device or aggregation device to the access point. The media may also store one or more instructions for providing an instruction that instructs the access point or the nearest capable access device or aggregation device to create a tunnel between the access point and the nearest capable access device or aggregation device. The access point or the nearest capable access device or aggregation device may create the tunnel between the access point and the nearest capable access device or aggregation device based on the instruction, and the tunnel may enable the access point and the nearest capable access device or aggregation device to exchange data traffic. The media may further store one or more instructions for creating a control traffic tunnel with the nearest capable access device or aggregation device, where the control traffic tunnel enables the nearest capable access device or aggregation device to send and receive security information.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1 is a diagram of an example network in which systems and/or methods described herein may be implemented;

FIG. 2 is a diagram of example components of a WLAN controller depicted in FIG. 1;

FIG. 3 is a diagram of example components of an access point, an access device, or an aggregation device depicted in FIG. 1;

FIGS. 4A-4C are diagrams of example interactions between components of an example portion of the network depicted in FIG. 1;

FIG. 6 is a diagram of example functional components of the WLAN controller illustrated in FIG. 1; and FIG. 7 is a flow chart of an example process for dynamically enhancing network performance of distributed WLAN architectures according to implementations described herein.

DETAILED DESCRIPTION

Figure 4B:
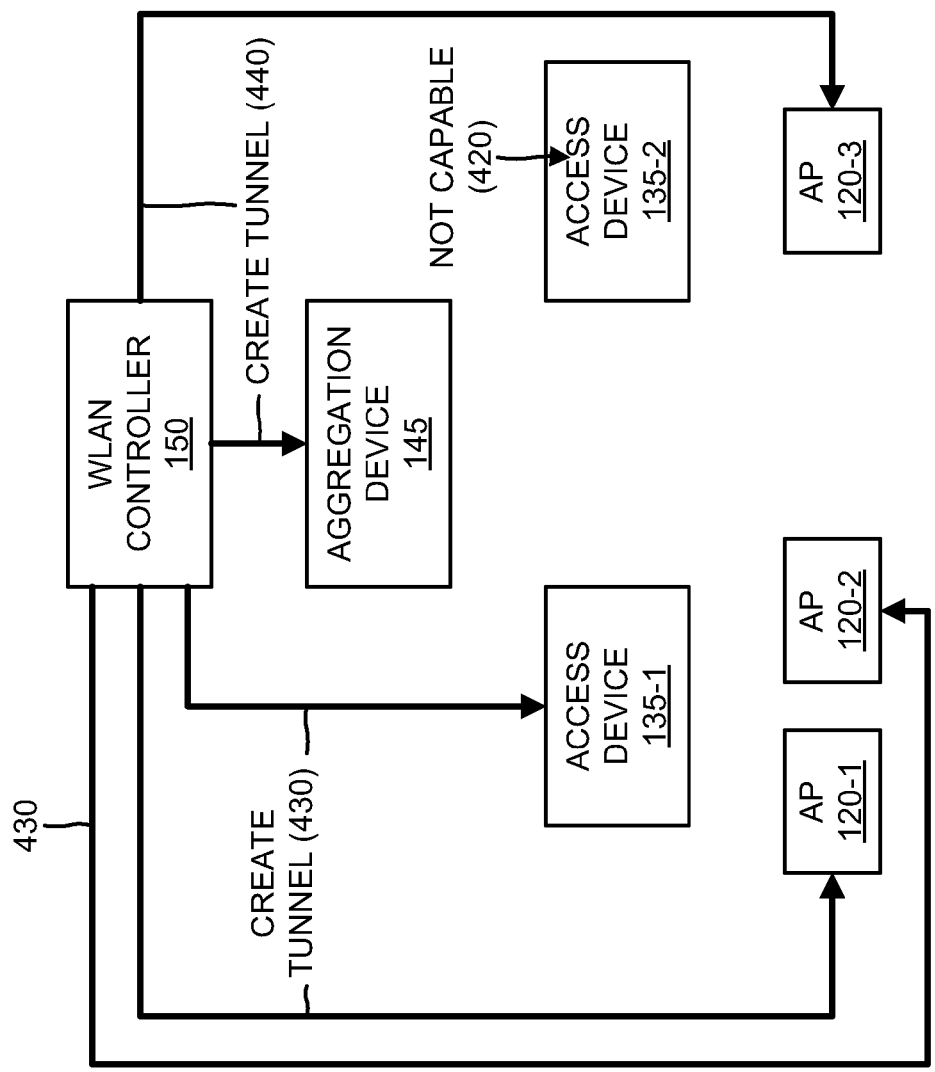

The following detailed description refers to the accompanying drawings. The same reference numbers in different drawings may identify the same or similar elements. Also, the following detailed description does not limit the invention.

Systems and/or methods described herein may dynamically and automatically create tunnels from access points to a nearest capable access device and/or aggregation device of a distributed WLAN network. The systems and/or methods may enhance network optimization with no manual configuration overhead. If the distributed WLAN network changes, the systems and/or methods may automatically create new tunnels so that data traffic may terminate at a nearest possible node (e.g., access device and/or aggregation device) in the network. In one example, the distributed WLAN network nodes may execute a protocol that determines network topology and determines capable nodes (e.g., nodes capable of terminating tunnels with access points, nodes capable of implementing security methods, nodes capable of forwarding traffic, etc.).

Systems and/or methods described herein may provide a more scalable distributed WLAN network that utilizes bandwidth more efficiently than centralized WLAN networks. The systems and/or methods may provide security at edges of the distributed WLAN network, may provide for faster layer 2 mobility, and may reduce bottlenecks at a WLAN controller of the distributed WLAN network.

In an example implementation, the systems and/or methods may receive topology and capability information associated with an access point, access devices, and aggregation devices of a WLAN, and may determine a nearest capable access device or aggregation device to the access point based on the topology/capability information. The systems and/or methods may instruct the access point or the nearest capable access/aggregation device to create a tunnel between the access point and the nearest capable access/aggregation device, and may create a control traffic tunnel with the nearest capable access/aggregation device. The systems and/or methods may distribute security information with the nearest capable access/aggregation device, via the control traffic tunnel, and may receive a change in the topology/capability information. The systems and/or methods may determine another nearest capable access device or aggregation device to the access point based on the change in the topology/capability information.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "tunnel," as used herein, is intended to be broadly construed to include a secure path through an untrusted network, a path that enables traffic (e.g., packets) to be provided over an incompatible delivery-network, etc.

FIG. 1 is a diagram of an example network 100 in which systems and/or methods described herein may be implemented. As illustrated, network 100 may include multiple client devices 110, multiple access points (APs) 120-1, 120-2, and 120-3 (collectively referred to herein as "access points 120," and singularly as "access point 120"), multiple access networks 130-1 and 130-2 (collectively referred to herein as "access networks 130," and singularly as "access network 130"), multiple access devices 135-1 and 135-2 (collectively referred to herein as "access devices 135," and singularly as "access device 135"), an aggregation network 140 (e.g., that includes an aggregation device 145), and a WLAN controller 150. In one example implementation, access points 120, access networks 130, access devices 135, aggregation network 140, aggregation device 145, and WLAN controller 150 may form a distributed WLAN architecture for client devices 110.

Components of network 100 may interconnect via wired and/or wireless connections or links. Seven client devices 110, three access points 120, two access networks 130, two access devices 135, one aggregation network 140, one aggregation device 145, and one WLAN controller 150 have been illustrated in FIG. 1 for simplicity. In practice, there may be more client devices 110, access points 120, access networks 130, access devices 135, aggregation networks 140, aggregation devices 145, and/or WLAN controllers 150. Also, in some instances, one or more of the components of network 100 may perform one or more tasks described as being performed by another one or more of the components of network 100.

Client device 110 may include any device that is capable of accessing the distributed WLAN network via one or more access points 120. For example, client device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a smart phone, a laptop computer, a personal computer, a printer, or other types of computation or communication devices.

Access point 120 may include a device that allows wired communication devices (e.g., access devices 135 and/or aggregation devices 145) to connect to a wireless network using wireless technologies (e.g., Wi-Fi, Bluetooth, or related standards). For example, access point 120 may connect to access device 135, and may communicate data between wireless devices (e.g., client devices 110) and access device 135. In one example, access point 120 may include a wireless network device, such as a wireless router. In one example implementation, one or more access points 120 may be provided in a particular area (e.g., a building) in order to provide client devices 110 with wireless access to additional networks (not shown).

Access network 130 may include one or more networks of any type. For example, access network 130 may include a LAN, a wide area network (WAN), a metropolitan area network (MAN), an intranet, or a combination of networks. In one example implementation, access network 130 may include a network that provides client devices 110 with wireless access (e.g., via access points 120) to additional networks (e.g., the Public Switched Telephone Network (PSTN), Public Land Mobile Network (PLMN), an intranet, the Internet, etc.).

Access device 135 may include a network device, such as a gateway, a router, a switch, a firewall, a network interface card (NIC), a hub, a bridge, a proxy server, an optical add-drop multiplexer (OADM), or some other type of device that processes and/or transfers traffic. In an example implementation, access device 135 may include a device that is capable of transmitting information to and/or receiving information from access points 120, aggregation network 140, and/or aggregation device 145.

Aggregation network 140 may include one or more networks of any type. For example, aggregation network 140 may include a LAN, a WAN, a MAN, an intranet, or a combination of networks. In one example implementation, aggregation network 140 may include a network that provides client devices 110 with wireless access (e.g., via access points 120) to additional networks (e.g., the PSTN, PLMN, an intranet, the Internet, etc.).

Aggregation device 145 may include a network device, such as a gateway, a router, a switch, a firewall, a NIC, a hub, a bridge, a proxy server, an OADM, or some other type of device that processes and/or transfers traffic. In an example implementation, aggregation device 145 may include a device that is capable of transmitting information to and/or receiving information from access networks 130, access devices 135, and/or WLAN controller 150. For example, aggregation device 145 may multiplex and/or demultiplex traffic between multiple access networks 130 and a link connecting aggregation device 145 to WLAN controller 150.

WLAN controller 150 may include one or more computation or communication devices, that gather, process, and/or provide information in a manner described herein. In one example, WLAN controller 150 may include a server device, a laptop computer, a personal computer, a workstation computer, etc. WLAN controller 150 may handle automatic adjustments to RF power, channels, authentication, and/or security associated with access points 120. WLAN controller 150 may communicate with aggregation device 145 via aggregation network 140.

In one example implementation, WLAN controller 150 may receive topology and capability information associated with a particular access point 120, access devices 135, and aggregation devices 145, and may determine a nearest capable access device 135 or aggregation device 145 to the particular access point 120 based on the topology/capability information. WLAN controller 150 may instruct the particular access point 120 or the nearest capable access device 135/aggregation device 145 to create a tunnel between the particular access point 120 and the nearest capable access device 135/aggregation device 145, and may create a control traffic tunnel with the nearest capable access device 135/aggregation device 145. WLAN controller 150 may distribute security information with the nearest capable access device 135/aggregation device 145, via the control traffic tunnel, and may receive a change in the topology/capability information. WLAN controller 150 may determine another nearest capable access device 135 or aggregation device 145 to the particular access point 120 based on the change in the topology/capability information.

Although FIG. 1 shows example components of network 100, in other implementations, network 100 may include fewer components, different components, differently arranged components, or additional components than depicted in FIG. 1.

FIG. 2 illustrates a diagram of example components of a device 200 that may correspond to WLAN controller 150 (FIG. 1). As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, ASICs, FPGAs, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example components of a device 300 that may correspond to access point 120, access device 135, or aggregation device 145 (FIG. 1). In one implementation, device 300 may also correspond to WLAN controller 150 (FIG. 1). As shown, device 300 may include input ports 310, a switching mechanism 320, output ports 330, and a control unit 340.

Input ports 310 may be a point of attachment for physical links and may be a point of entry for incoming traffic (e.g., packets). Input ports 310 may carry out data link layer encapsulation and decapsulation. Input ports 310 may look up a destination address of an incoming packet in a forwarding table to determine its destination port (i.e., route lookup). In example implementations, input ports 310 may send (e.g., may be an exit point) and/or receive (e.g., may be an entry point) packets.

Switching mechanism 320 may interconnect input ports 310 with output ports 330. Switching mechanism 320 may be implemented using many different techniques. For example, switching mechanism 320 may be implemented via busses, crossbars, and/or with shared memories (e.g., which may act as temporary buffers to store traffic from input ports 310 before the traffic is eventually scheduled for delivery to output ports 330).

Output ports 330 may store packets and may schedule packets for service on output links (e.g., physical links). Output ports 330 may include scheduling algorithms that support priorities and guarantees. Output ports 330 may support data link layer encapsulation and decapsulation, and/or a variety of higher-level protocols. In an example implementations, output ports 330 may send packets (e.g., may be an exit point) and/or receive packets (e.g., may be an entry point).

Control unit 340 may use routing protocols and one or more forwarding tables for forwarding packets. Control unit 340 may interconnect with input ports 310, switching mechanism 320, and output ports 330. Control unit 340 may compute a forwarding table, implement routing protocols, and/or run software to configure and manage device 300. Control unit 340 may handle any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to the shared memories (e.g., in switching mechanism 320), queued in the shared memories (e.g., based on processing results), and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4C:
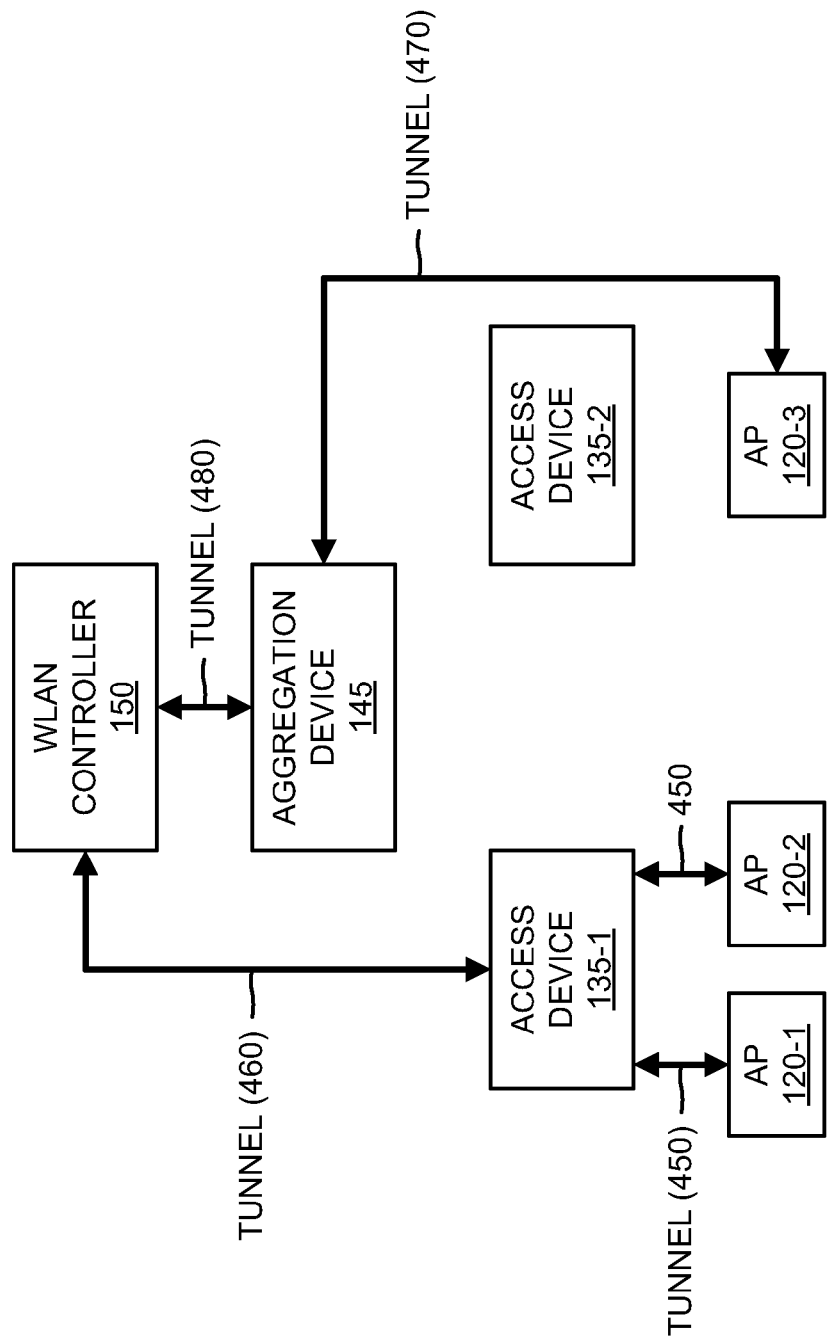

FIGS. 4A-4C are diagrams of example interactions between components of an example portion 400 of network 100. As illustrated, example network portion 400 may include access points 120-1, 120-2, and 120-3, access devices 135-1 and 135-2, aggregation device 145, and WLAN controller 150. Access points 120-1, 120-2, and 120-3, access devices 135-1 and 135-2, aggregation device 145, and WLAN controller 150 may include the features described above in connection with, for example, one or more of FIGS. 1-3. In one implementation, network portion 400 may provide a distributed WLAN architecture.

A protocol may be executed on all nodes (e.g., access points 120-1, 120-2, and 120-3, access devices 135-1 and 135-2, and aggregation device 145) of network portion 400. In one example implementation, the protocol may include an Intermediate System to Intermediate System (IS-IS) or an Open Shortest Path First (OSPF) type protocol that may determine a best route for traffic through network portion 400. The protocol may cause the nodes of network portion 400 to exchange topology and capability information 410, and to provide topology/capability information 410 to WLAN controller 150 (e.g., when the protocol converges), as shown in FIG. 4A. Topology/capability information 410 may include, for example: a layout pattern of interconnections of various elements (e.g., links, nodes, etc.) of network portion 400 (e.g., obtained via topology discovery method); hardware and software capabilities associated with the nodes (e.g., access points 120-1, 120-2, and 120-3, access devices 135-1 and 135-2, and aggregation device 145); whether the nodes can terminate tunnels to other nodes or to WLAN controller 150; whether the nodes can implement security methods (e.g., secure tunnels, encryption, etc.); whether the nodes can forward traffic to other nodes or to WLAN controller 150; etc.

In one example implementation, the protocol may execute on all layer 2 and layer 3 nodes (e.g., access points 120-1, 120-2, and 120-3, access devices 135-1 and 135-2, and aggregation device 145) of a network (e.g., network portion 400). In another example implementation, if topology/capability information 410 indicates that no nodes of network portion 400 are capable devices (e.g., capable of terminating tunnels, implementing security methods, forwarding traffic, etc.), network portion 400 may fall back to a centralized WLAN architecture.

WLAN controller 150 may receive topology/capability information 410, and may determine, based on topology/capability information 410, a nearest capable access device 135 or aggregation device 145 to each of access points 120-1, 120-2, and 120-3. For example, with reference to FIG. 4B, WLAN controller 150 may determine, based on topology/capability information 410, that access device 135-1 is the nearest capable device (e.g., capable of terminating tunnels, implementing security methods, forwarding traffic, etc.) to access points 120-1 and 120-2. WLAN controller 150 may determine, based on topology/capability information 410, that access device 135-2 is not capable (e.g., as indicated by reference number 420) and that aggregation device 145 is the nearest capable device (e.g., capable of terminating tunnels, implementing security methods, forwarding traffic, etc.) to access point 120-3.

As further shown in FIG. 4B, WLAN controller 150 may instruct, as indicated by reference number 430, access points 120-1 and 120-2 to create tunnels between access points 120-1 and 120-2 and access device 135-1 (e.g., the nearest capable device to access points 120-1 and 120-2). Alternatively, WLAN controller 150 may instruct 430 access device 135-1 to create tunnels between access points 120-1 and 120-2 and access device 135-1. WLAN controller 150 may also instruct 430 access device 135-1 to create a control traffic tunnel between access device 135-1 and WLAN controller 150. WLAN controller 150 may instruct, as indicated by reference number 440, access point 120-3 to create a tunnel between access point 120-3 and aggregation device 145 (e.g., the nearest capable device to access point 120-3). Alternatively, WLAN controller 150 may instruct 440 aggregation device 145 to create a tunnel between access point 120-3 and aggregation device 145. WLAN controller 150 may also instruct 440 aggregation device 145 to create a control traffic tunnel between aggregation device 145 and WLAN controller 150.

As shown in FIG. 4C, based on instructions 430, access points 120-1 and 120-2 (and/or access device 135-1) may create tunnels 450 between access points 120-1 and 120-2 and access device 135-1. Tunnels 450 may enable data traffic to be exchanged between access points 120-1 and 120-2 and access device 135-1. Based on instructions 430, access device 135-1 may create a control traffic tunnel 460 between access device 135-1 and WLAN controller 150. Control traffic tunnel 460 may enable control traffic (e.g., security information) to be exchanged between access device 135-1 and WLAN controller 150.

As further shown in FIG. 4C, based on instructions 440, access point 120-3 (and/or aggregation device 145) may create a tunnel 470 between access point 120-3 and aggregation device 145. Tunnel 470 may enable data traffic to be exchanged between access point 120-3 and aggregation device 145. Based on instructions 440, aggregation device 145 may create a control traffic tunnel 480 between aggregation device 145 and WLAN controller 150. Control traffic tunnel 480 may enable control traffic (e.g., security information) to be exchanged between aggregation device 145 and WLAN controller 150.

Although FIGS. 4A-4C show example components of network portion 400, in other implementations, network portion 400 may include fewer components, different components, differently arranged components, or additional components than depicted in FIGS. 4A-4C. Alternatively, or additionally, one or more components of network portion 400 may perform one or more other tasks described as being performed by one or more other components of network portion 400.

Figure 5A:
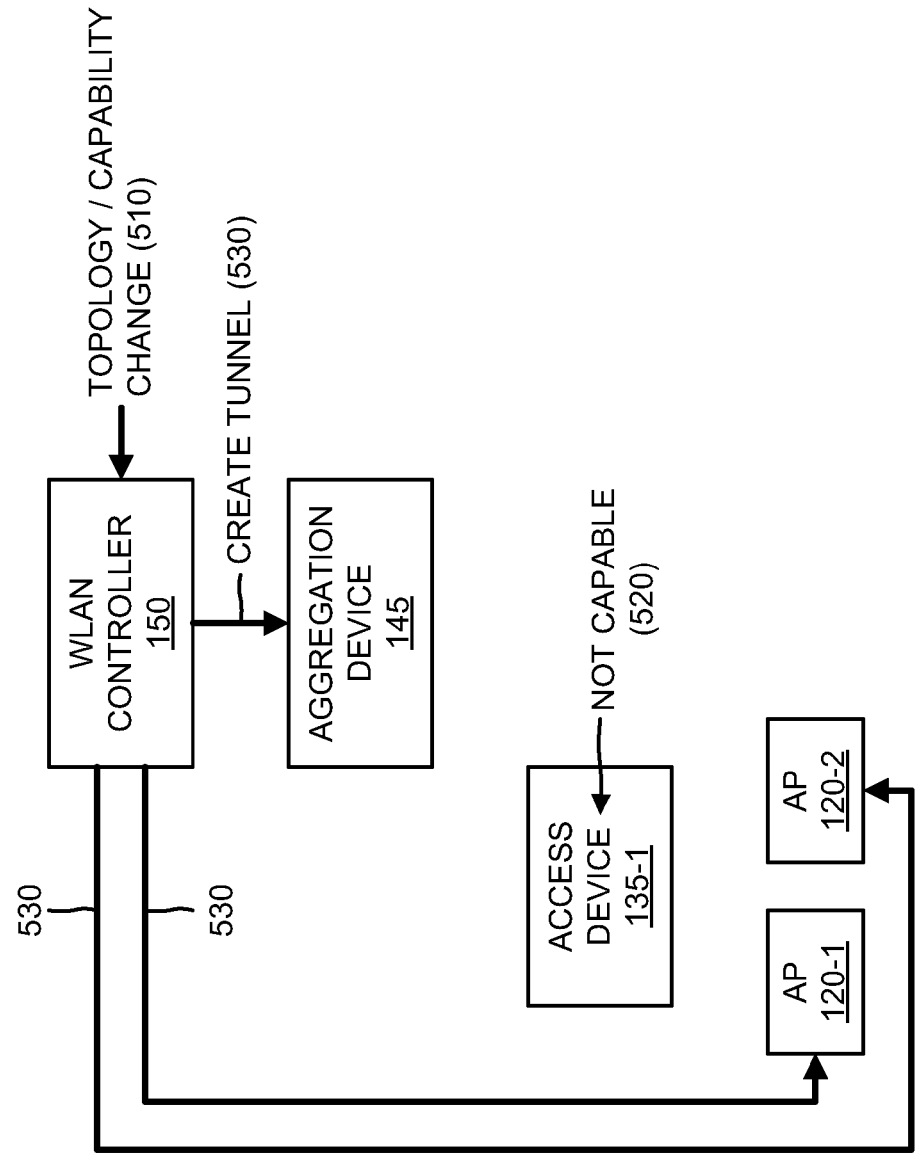
FIGS. 5A and 5B are diagrams of example interactions between components of another example portion of the network depicted in FIG. 1.
Figure 5B:
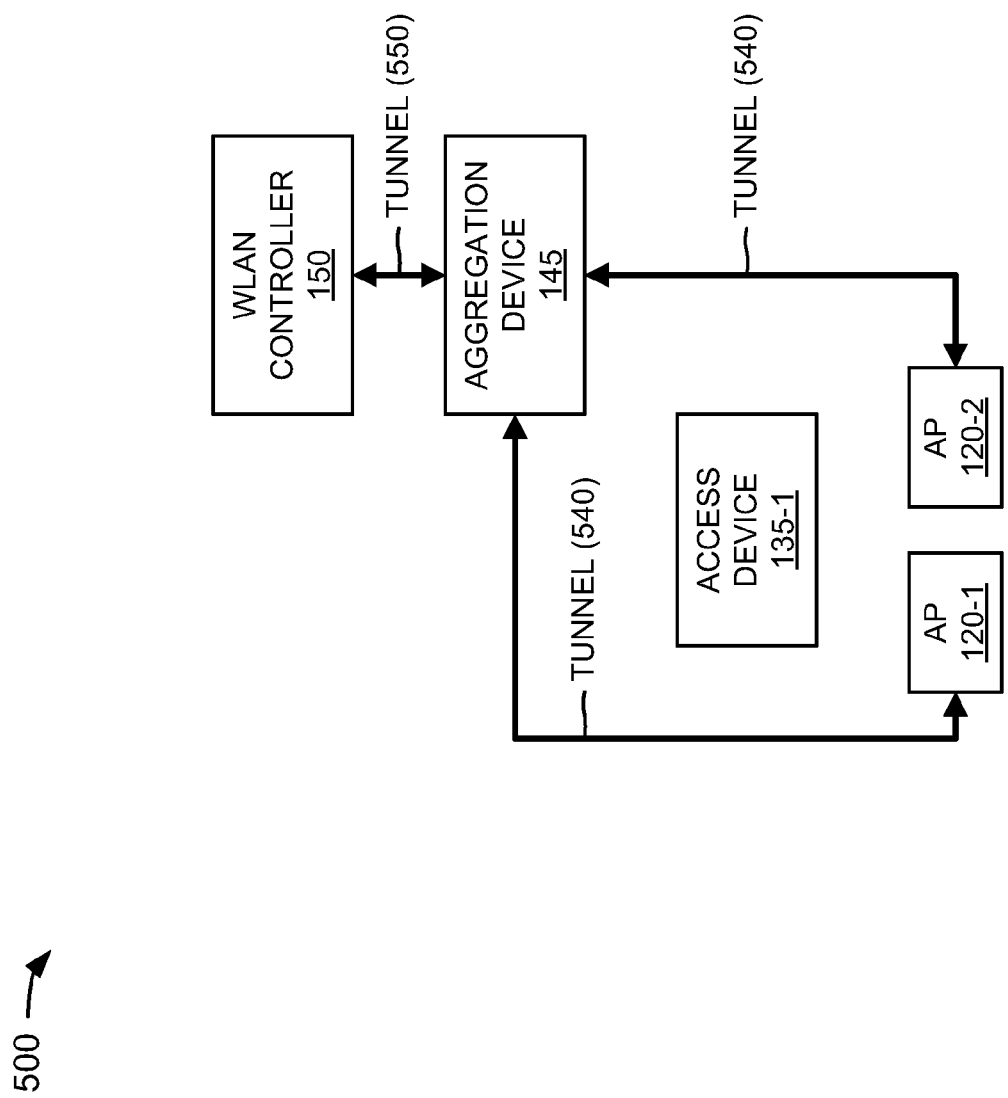

FIGS. 5A and 5B are diagrams of example interactions between components of another example portion 500 of network 100. As illustrated, example network portion 500 may include access points 120-1 and 120-2, access device 135-1, aggregation device 145, and WLAN controller 150. Access points 120-1 and 120-2, access device 135-1, aggregation device 145, and WLAN controller 150 may include the features described above in connection with, for example, one or more of FIGS. 1-4C. In one implementation, network portion 500 may provide a distributed WLAN architecture.

As shown in FIG. 5A, a topology/capability change 510 may indicate that access device 135-1 is no longer a capable device (e.g., capable of terminating tunnels, implementing security methods, forwarding traffic, etc.). When topology/capability change 510 occurs, the protocol (e.g., described above in connection with FIGS. 4A-4C) may be re-executed on all nodes (e.g., access points 120-1 and 120-2, access device 135-1, and aggregation device 145) of network portion 500. WLAN controller 150 may receive topology/capability change 510, and may determine, based on topology/capability change 510, a nearest capable access device 135 or aggregation device 145 to each of access points 120-1 and 120-2. For example, WLAN controller 150 may determine, based on topology/capability change 510, that aggregation device 145 is the nearest capable device (e.g., capable of terminating tunnels, implementing security methods, forwarding traffic, etc.) to access points 120-1 and 120-2.

As further shown in FIG. 5A, WLAN controller 150 may instruct 530 access points 120-1 and 120-2 to create tunnels between access points 120-1 and 120-2 and aggregation device 145 (e.g., the nearest capable device to access points 120-1 and 120-2). Alternatively, WLAN controller 150 may instruct 530 aggregation device 145 to create tunnels between access points 120-1 and 120-2 and aggregation device 145. WLAN controller 150 may also instruct 530 aggregation device 145 to create a control traffic tunnel between aggregation device 145 and WLAN controller 150.

As shown in FIG. 5B, based on instructions 530, access points 120-1 and 120-2 (and/or aggregation device 145) may create tunnels 540 between access points 120-1 and 120-2 and aggregation device 145. Tunnels 540 may enable data traffic to be exchanged between access points 120-1 and 120-2 and aggregation device 145. Based on instructions 530, aggregation device 145 may create a control traffic tunnel 550 between aggregation device 145 and WLAN controller 150. Control traffic tunnel 550 may enable control traffic (e.g., security information) to be exchanged between aggregation device 145 and WLAN controller 150.

Although FIGS. 5A and 5B show example components of network portion 500, in other implementations, network portion 500 may include fewer components, different components, differently arranged components, or additional components than depicted in FIGS. 5A and 5B. Alternatively, or additionally, one or more components of network portion 500 may perform one or more other tasks described as being performed by one or more other components of network portion 500.

FIG. 6 is a diagram of example functional components of WLAN controller 150. In one implementation, the functions described in connection with FIG. 6 may be performed by one or more components of device 200 (FIG. 2). As illustrated in FIG. 6, WLAN controller 150 may include a topology/capability receiver 600, a nearest device determiner 610, and a tunnel instruction generator 620.

Topology/capability receiver 600 may include hardware or a combination of hardware and software that may receive topology/capability information 410 from the nodes (e.g., access points 120-1, 120-2, and 120-3, access devices 135-1 and 135-2, and aggregation device 145) of network portion 400, or may receive topology/capability change 510 from the nodes (e.g., access points 120-1 and 120-2, access device 135-1, and aggregation device 145) of network portion 500. Topology/capability receiver 600 may determine a list 630 of incapable devices (e.g., devices not capable of terminating tunnels, implementing security methods, forwarding traffic, etc.) based on topology/capability information 410 or topology/capability change 510. For example, with reference to FIG. 4B, topology/capability receiver 600 may determine access device 135-2 to be included in list 630 of incapable devices. As further shown in FIG. 6, topology/capability receiver 600 may provide list 630 of incapable devices to nearest device determiner 610.

Nearest device determiner 610 may include hardware or a combination of hardware and software that may receive list 630 of incapable devices from topology/capability receiver 600, and may receive topology/capability information 410 or topology/capability change 510. Nearest device determiner 610 may determine (e.g., based on information 410, change 510, and/or list 630) a nearest capable access device 135 or aggregation device 145 to each of access points 120. For example, with reference to FIG. 4B, nearest device determiner 610 may determine that access device 135-1 is the nearest capable device to access points 120-1 and 120-2. Based on such determinations, nearest device determiner 610 may generate a list 640 of access point 120 and access device 135/aggregation device 145 pairings. Nearest device determiner 610 may provide list 640 of determined pairings to tunnel instruction generator 620.

Tunnel instruction generator 620 may include hardware or a combination of hardware and software that may receive list 640 of determined pairings from nearest device determiner 610, and may generate instructions to create tunnels between access points 120 and the nearest capable devices to access points 120 based on list 640 of determined pairings. For example, tunnel instruction generator 620 may generate instructions 430 (FIG. 4B), instructions 440 (FIG. 4B), and/or instructions 530 (FIG. 5A). Tunnel instruction generator 620 may provide instructions 430, 440, and/or 530 to the appropriate devices.

Although FIG. 6 shows example functional components of WLAN controller 150, in other implementations, WLAN controller 150 may include fewer functional components, different functional components, differently arranged functional components, or additional functional components than depicted in FIG. 6. Alternatively, or additionally, one or more functional components of WLAN controller 150 may perform one or more other tasks described as being performed by one or more other functional components of WLAN controller 150.

FIG. 7 is a flow chart of an example process 700 for dynamically enhancing network performance of distributed WLAN architectures according to implementations described herein. In one implementation, process 700 may be performed by WLAN controller 150. In another implementation, some or all of process 700 may be performed by another device in conjunction with WLAN controller 150.

As illustrated in FIG. 7, process 700 may include receiving topology/capability information associated with an access point (AP), access device(s), and aggregation device(s) of a WLAN (block 710). For example, in implementations described above in connection with FIG. 4A, a protocol may cause the nodes of network portion 400 to exchange topology and capability information 410, and to provide topology/capability information 410 to WLAN controller 150 (e.g., when the protocol converges). Topology/capability information 410 may include a layout pattern of interconnections of various elements (e.g., links, nodes, etc.) of a network, hardware and software capabilities associated with the nodes, whether the nodes can terminate tunnels to other nodes or to WLAN controller 150, whether the nodes can implement security methods (e.g., secure tunnels, encryption, etc.), whether the nodes can forward traffic to other nodes or to WLAN controller 150, etc.

As further shown in FIG. 7, process 700 may include determining a nearest capable access device or aggregation device to the access point based on the topology/capability information (block 720). For example, in implementations described above in connection with FIG. 4B, WLAN controller 150 may determine, based on topology/capability information 410, a nearest capable access device 135 or aggregation device 145 to each of access points 120-1, 120-2, and 120-3. In one example, WLAN controller 150 may determine, based on topology/capability information 410, that access device 135-1 is the nearest capable device (e.g., capable of terminating tunnels, implementing security methods, forwarding traffic, etc.) to access points 120-1 and 120-2. WLAN controller 150 may determine, based on topology/capability information 410, that access device 135-2 is not capable (e.g., as indicated by reference number 420) and that aggregation device 145 is the nearest capable device to access point 120-3.

Returning to FIG. 7, process 700 may include instructing the access point or the nearest capable access device or aggregation device to create a tunnel between them (block 730), and creating a control traffic tunnel with the nearest capable access device or aggregation device (block 740). For example, in implementations described above in connection with FIG. 4B, WLAN controller 150 may instruct 430 access points 120-1 and 120-2 to create tunnels between access points 120-1 and 120-2 and access device 135-1 (e.g., the nearest capable device to access points 120-1 and 120-2). Alternatively, WLAN controller 150 may instruct 430 access device 135-1 to create tunnels between access points 120-1 and 120-2 and access device 135-1. WLAN controller 150 may also instruct 430 access device 135-1 to create a control traffic tunnel between access device 135-1 and WLAN controller 150.

As further shown in FIG. 7, process 700 may include distributing security information with the nearest capable access device or aggregation device, via the control traffic tunnel (block 750). For example, in implementations described above in connection with FIG. 4C, based on instructions 430, access device 135-1 may create control traffic tunnel 460 between access device 135-1 and WLAN controller 150. Control traffic tunnel 460 may enable control traffic (e.g., security information) to be exchanged between access device 135-1 and WLAN controller 150.

Returning to FIG. 7, if a change in the topology/capability information is received (block 760), process 700 may re-perform one or more of process blocks 720-750 based on the change in the topology/capability information. For example, in implementations described above in connection with FIG. 5A, topology/capability change 510 may indicate that access device 135-1 is no longer a capable device (e.g., capable of terminating tunnels, implementing security methods, forwarding traffic, etc.). When topology/capability change 510 occurs, the protocol may be re-executed on all nodes of network portion 500. WLAN controller 150 may receive topology/capability change 510, and may determine, based on topology/capability change 510, a nearest capable access device 135 or aggregation device 145 to each of access points 120-1 and 120-2. In one example, WLAN controller 150 may determine, based on topology/capability change 510, that aggregation device 145 is the nearest capable device to access points 120-1 and 120-2.

Systems and/or methods described herein may dynamically and automatically create tunnels from access points to a nearest capable access device and/or aggregation device of a distributed WLAN network. The systems and/or methods may enhance network optimization with no manual configuration overhead. If the distributed WLAN network changes, the systems and/or methods may automatically create new tunnels so that data traffic may terminate at nearest possible node (e.g., access device and/or aggregation device) in the network. In one example, the distributed WLAN network nodes may execute a protocol that determines network topology and determines capable nodes (e.g., nodes capable of terminating tunnels with access points, nodes capable of implementing security methods, nodes capable of forwarding traffic, etc.).

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device, topology and capability information associated with an access point, of a wireless local area network (WLAN), a plurality of available access devices of the WLAN, and an aggregation device of the WLAN,
      the topology and capability information including:
         at least one of hardware capabilities or software capabilities associated with the access point, the plurality of available access devices, and the aggregation device;
   determining, by the computing device and based on the topology and capability information, that at least two of the plurality of available access devices may provide information to the access point;
   determining, by the computing device and based on the topology and capability information, a nearest capable access device, of the at least two of the plurality of available access devices and the aggregation device, to the access point;
   causing, by the computing device, creation of a tunnel between the access point and the nearest capable access device of the at least two of the plurality of available access devices and the aggregation device;
   receiving, by the computing device, a change in the topology and capability information,
      the change in the topology and capability information indicating that the nearest capable access device, of the at least two of the plurality of available access devices and the aggregation device, is no longer capable of creating the tunnel; and
   determining, by the computing device and based on the change in the topology and capability information, another nearest capable access device of the at least two of the plurality of available access devices and the aggregation device to the access point.

2. The method of claim 1, where the tunnel enables the access point and the nearest capable access device of the at least two of the plurality of available access devices and the aggregation device to exchange data traffic.

3. The method of claim 1, further comprising:
   creating a control traffic tunnel between the computing device and the nearest capable access device of the at least two of the plurality of available access devices and the aggregation device,
   where the control traffic tunnel enables the computing device and the nearest capable access device of the at least two of the plurality of available access devices and the aggregation device to exchange security information.

4. The method of claim 1, further comprising:
   instructing the access point and the other nearest capable access device of the at least two of the plurality of available access devices and the aggregation device to create another tunnel between the access point and the other nearest capable access device of the at least two of the plurality of available access devices and the aggregation device.

5. The method of claim 1, where the topology and capability information is determined based on a protocol executing on the access point, the plurality of available access devices, and the aggregation device.

6. The method of claim 1, where the topology and capability information further includes one or more of:
   an indication of whether the access point, the plurality of available access devices, and the aggregation device can terminate tunnels to the computing device,
   an indication of whether the access point, the plurality of available access devices, and the aggregation device can implement security methods, or
   an indication of whether the access point, the plurality of available access devices, and the aggregation device can forward traffic to the computing device.

7. The method of claim 1, where the WLAN includes a distributed WLAN architecture.

8. The method of claim 1, where the computing device includes a WLAN controller.

9. A device comprising:
   a memory to store a plurality of instructions; and
   a processor to execute the plurality of instructions in the memory to:
      receive topology and capability information associated with an access point, of a wireless local area network (WLAN), a plurality of available access devices of the WLAN, and an aggregation device of the WLAN,
         the topology and capability information including:
            at least one of hardware capabilities or software capabilities associated with the access point, the plurality of available access devices, and the aggregation device;
      determine, based on the topology and capability information, that at least two of the plurality of available access devices may provide information to the access point,
      determine, based on the topology and capability information, a nearest capable access device, of the at least two of the plurality of available access devices and the aggregation device, to the access point,
      cause creation of a tunnel between the access point and the nearest capable access device of the at least two of the plurality of available access devices and the aggregation device,
      receive an indication that the nearest capable access device of the at least two of the plurality of available access devices and the aggregation device is no longer capable of creating the tunnel, and
      determine, based on the indication, another nearest capable access device of the at least two of the plurality of available access devices and the aggregation device to the access point.

10. The device of claim 9, where the device comprises a WLAN controller of the WLAN.

11. The device of claim 9, where the tunnel enables the access point and the nearest capable access device of the at least two of the plurality of available access devices and the aggregation device to exchange data traffic.

12. The device of claim 9, where the processor is further to:
   create a control traffic tunnel between the device and the nearest capable access device of the at least two of the plurality of available access devices and the aggregation device, where the control traffic tunnel enables the device and the nearest capable access device of the at least two of the plurality of available access devices and the aggregation device to exchange security information.

13. The device of claim 9, where the processor is further to:
instruct the access point, the other nearest capable access device of the at least two of the plurality of available access devices and the aggregation device to create a tunnel between the access point and the other nearest capable access device of the at least two of the plurality of available access devices and the aggregation device.

14. The device of claim 9, where the topology and capability information is generated based on execution of a protocol by the access point, the plurality of available access devices, and the aggregation device.

15. The device of claim 9, where the topology and capability information further includes one or more of:
an indication of whether the access point, the plurality of available access devices, and the aggregation device can terminate tunnels to the device,
an indication of whether the access point, the plurality of available access devices, and the aggregation device can implement security methods, or
an indication of whether the access point, the plurality of available access devices, and the aggregation device can forward traffic to the device.

16. The device of claim 9, where the WLAN includes a distributed WLAN architecture.

17. A non-transitory computer-readable medium storing instructions, the instructions comprising:
one or more instructions which, when executed by at least one processor of a computing device, cause the at least one processor to:
receive topology and capability information associated with an access point, of a wireless local area network (WLAN), a plurality of available access devices of the WLAN, and an aggregation device of the WLAN,
the topology and capability information including:
at least one of hardware capabilities or software capabilities associated with the access point, the plurality of available access devices, and the aggregation device;
determine, based on the topology and capability information, that at least two of the plurality of available access devices may provide information to the access point;
determine, based on the topology and capability information, a nearest capable access device, of the at least two of the plurality of available access devices and the aggregation device, to the access point;
provide an instruction to the access point, the nearest capable access device of the at least two of the plurality of available access devices and the aggregation device to create a tunnel between the access point and the nearest capable access device of the at least two of the plurality of available access devices and the aggregation device,
the tunnel enabling the access point and the nearest capable access device of the at least two of the plurality of available access devices and the aggregation device to exchange data traffic;
create a control traffic tunnel between the computing device and the nearest capable access device of the at least two of the plurality of available access devices and the aggregation device,
the control traffic tunnel enabling the nearest capable access device of the at least two of the plurality of available access devices and the aggregation device to send and receive information;
receive a change in the topology and capability information,
the change in the topology and capability information indicating that the nearest capable access device of the at least two of the plurality of available access devices and the aggregation device is no longer capable of creating the tunnel; and
determine, based on the change in the topology and capability information, another nearest capable access device of the at least two of the plurality of available access devices and the aggregation device to the access point.

18. The medium of claim 17, where the instructions further include:
one or more instructions to instruct the access point, the other nearest capable access device of the at least two of the plurality of available access devices and the aggregation device to create another tunnel between the access point and the other nearest capable access device of the at least two of the plurality of available access devices and the aggregation device.

19. The medium of claim 17, where the topology and capability information is determined based on a protocol executing on the access point, the plurality of available access devices, and the aggregation device.

20. The medium of claim 17, where the topology and capability information further includes one or more of:
an indication of whether the access point, the plurality of available access devices, and the aggregation device can terminate tunnels to the computing device,
an indication of whether the access point, the plurality of available access devices, and the aggregation device can implement security methods, or
an indication of whether the access point, the plurality of available access devices, and the aggregation device can forward traffic to the computing device.

21. The medium of claim 17, where the WLAN includes a distributed WLAN architecture.

* * * * *